United States Patent
Ryu et al.

(10) Patent No.: US 8,583,726 B2
(45) Date of Patent: Nov. 12, 2013

(54) EVENT-PROCESSING METHOD AND SYSTEM FOR A HOME NETWORK SUPPORTING A REMOTE USER INTERFACE

(75) Inventors: Young Sun Ryu, Seongnam-si (KR); Kook Heui Lee, Suwon-si (KR); Jae Yeon Song, Seoul (KR)

(73) Assignee: Samsung Electronics Co., Ltd. (KR)

( * ) Notice: Subject to any disclaimer, the term of this patent is extended or adjusted under 35 U.S.C. 154(b) by 558 days.

(21) Appl. No.: 12/788,824

(22) Filed: May 27, 2010

(65) Prior Publication Data

US 2010/0306312 A1    Dec. 2, 2010

(30) Foreign Application Priority Data

May 28, 2009   (KR) ................. 10-2009-0046736

(51) Int. Cl.
*G06F 15/16* (2006.01)
(52) U.S. Cl.
USPC .......................................... 709/203; 709/229
(58) Field of Classification Search
USPC .................................................. 709/203, 229
See application file for complete search history.

(56) References Cited

U.S. PATENT DOCUMENTS

| | | | |
|---|---|---|---|
| 6,292,825 B1 | 9/2001 | Chang et al. | |
| 6,654,765 B2 | 11/2003 | Wong et al. | |
| 2002/0042830 A1 | 4/2002 | Bose et al. | |
| 2005/0022210 A1 | 1/2005 | Zintel et al. | |
| 2007/0089055 A1 | 4/2007 | Ko et al. | |
| 2008/0120422 A1* | 5/2008 | Park et al. | ............... 709/229 |

FOREIGN PATENT DOCUMENTS

| | | |
|---|---|---|
| EP | 1 811 747 | 7/2007 |
| KR | 1020090079396 | 7/2009 |
| WO | WO 2009/008578 | 1/2009 |
| WO | WO 2009/091222 | 7/2009 |

OTHER PUBLICATIONS

Wikipedia, the free encyclopedia, "Post Office Protocol", Oct. 5, 2006.

* cited by examiner

*Primary Examiner* — Larry Donaghue
*Assistant Examiner* — Marshall McLeod
(74) *Attorney, Agent, or Firm* — The Farrell Law Firm, P.C.

(57) ABSTRACT

An event-processing method and system are provided for efficiently re-delivering notification events stored by a Remote User Interface Server (RUIS), from the RUIS to remote user interface clients (RUICs), in a home network supporting an RUI. An RUIC transmits an information request to the remote user interface server, receives, from the RUIS, notification event information corresponding to the information request, transmits a notification event request based on the received notification event information to the RUIS, and receives, from the RUIS, at least one notification event corresponding to the notification event request.

20 Claims, 6 Drawing Sheets

EVENT-PROCESSING METHOD AND SYSTEM FOR A HOME NETWORK SUPPORTING A REMOTE USER INTERFACE

PRIORITY

This application claims priority under 35 U.S.C. 119(a) to an application filed in the Korean Intellectual Property Office on May 28, 2009, and assigned Serial No. 10-2009-0046736, the content of which is incorporated herein by reference.

BACKGROUND OF THE INVENTION

1. Field of the Invention

The present invention relates generally to a home network system and, in particular, to an event-processing method and system for efficiently re-delivering notification events preserved by a Remote User Interface Server (RUIS) to Remote User Interface Clients (RUICs) in a home network supporting a Remote User Interface (RUI).

2. Description of the Related Art

Several industrial standardization organizations such as Digital Living Network Alliance (DLNA), Home Audio-Video Interoperability (HAVi), and Universal Plug and Play (UPnP) are conducting research on technologies for enhanced home networks.

RUI technology is one of the promising technologies for enhancing operability of home network systems. Typically, RUI technology is implemented based on a client-server architecture in which an RUIC downloads a User Interface (UI) from an RUIS in order for a user to control the RUIC via the UI.

FIG. 1 is a signaling diagram illustrating operations of network entities for delivering a $3^{rd}$ party notification event in a conventional home network.

Referring to FIG. 1, if a notification event to be delivered to a user is detected while a UI session with an RUIC 10 is released, an RUIS 20 multicasts the notification event within the home network in step S101. For example, the notification event can be transmitted in the General Event Notification Architecture (GENA) format. The notification event can be received by any of the clients included in the home network, including the RUIC 20.

After receiving the notification event, the RUIC 10 requests a notification page from the RUIS 20 for and displays the RUI, corresponding to the notification event, received from the RUIS 20 in step S103. For example, the RUIC 10 requests the notification page from the RUIS 20 using "http-get" with a Uniform Resource Locator (URL) contained in the notification event.

In some situations, however, there may not be an RUIC to receive the notification event transmitted by the RUIS 20. In this case, the RUIS 20 does not receive a notification page request at step S103.

In FIG. 1, steps S105 to S113 are illustrated under the assumption that no RUIC exists (e.g., the RUIC 10 is powered off) in steps S101 and S103.

In step S105, if it is determined that there is no RUIC to receive the notification event, i.e., a notification page request is not received in step S103, the RUIS 20 saves the notification page. Thereafter, if the RUIC 10 enters the network again, e.g., powers on, it notifies the RUIS 20 of its network entry in step S107.

Upon detecting the network entry of the RUIC 10, the RUIS 20 multicasts all of the saved notification events in step S109. If the notification events are received, the RUIC 10 requests the notification page from the RUIS 20 in step S111, and the RUIS 20 transmits the requested notification page to the RUIC 10 and discards the saved notification page in step S113.

This conventional notification event delivery method, wherein the RUIS stores the notification event for an absent RUIC, until its network entry, has a number of problems.

First, the RUIS cannot identify an RUIC requesting a notification page among multiple RUICs, when the RUIS is required to retransmit a stored notification event. FIG. 2 is a diagram illustrating such a problematic situation.

Referring to FIG. 2, when multiple RUICs 11, 12, and 13 are included in the network, any of the RUICs 11, 12, and 13 can request a notification page from the RUIS 20. Currently, however, the RUIS 20 cannot identify which of the RUICs 11, 12, and 13 has requested for the notification page, when it needs to transmit the stored notification event (e.g., after receiving a network entry notification in step S201 or after receiving a notification page request in step S205). Accordingly, the RUIS 20 has to transmit the notification event in multicast mode in step S203, in order for all of the RUICs 11, 12, and 13 to receive the notification event.

Second, when an RUIC enters a network, it cannot request the RUIS 20 for a specific notification event among the notification events saved therein. For example, when a user has been absent for a long time, a plurality of notification events might be stored in the RUIS 20. Thereafter, when the user's RUIC enters the network after the long absence, all of the large number of notification events are transmitted in the home network, which makes it difficult for the user to find a specific notification event.

Third, in the conventional methods, the RUIS 20 will delete the stored notification page when the notification page is requested by an RUIC, as illustrated in step S113 of FIG. 1, in order to prevent the same notification event from being retransmitted repeatedly, even after the RUIC has already received the notification event. However, in this scenario, if the stored notification page is deleted by a device receiving the notification event, other RUICs cannot receive this notification page.

Additionally, there can also be a situation where an RUIC would like to recheck a notification event that has been checked already. However, because the notification event was deleted after the first delivery, is a conventional method cannot support the rechecking of the notification event that was already delivered.

SUMMARY OF THE INVENTION

Accordingly, the present invention has been designed to address at least the above-mentioned problems occurring in the prior art, and the present invention provides an event-processing method and system for a home network system which are capable of processing preserved notification events under RUIC-specific conditions.

In accordance with an aspect of the present invention, a notification event-processing method for a remote user interface client in a network is provided. The method includes transmitting, by the remote user interface client, an information request to the server; receiving, from the server, notification event information corresponding to the information request; transmitting a notification event request based on the received notification event information to the server; and receiving, from the server, at least one notification event corresponding to the notification event request.

In accordance with another aspect of the present invention, a notification event-processing method for a remote user interface server in a network including the remote user interface server and at least one remote user interface client is provided. The method includes receiving, by the remote user interface server, a request for notification event information from a remote user interface client among the at least one remote user interface client; transmitting the notification event information of preserved notification events indicated by the request, to the remote user interface client remote user interface; receiving, from the remote user interface client, a request for at least one notification event among the preserved notification events; and transmitting at least one of the preserved notification events corresponding to the at least one notification event requested by the remote user interface client.

In accordance with another aspect of the present invention, a system for processing notification events includes a remote user interface client for requesting notification event information and requesting at least one stored notification event by referencing acquired notification event information; and a remote user interface server for storing notification events, transmitting, to the remote user interface client, the notification event information requested by the client, retrieving the requested at least one stored notification event, and transmitting the retrieved at least one stored notification event to the remote user interface client.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION OF EMBODIMENTS OF THE INVENTION

Various advantages, features, and operations of certain embodiments of the present invention can be learned from a reading of the following detailed description in conjunction with the accompanying drawings. Many variations of the present invention not illustrated herein will occur to those skilled in the art. Additionally, the present invention is not limited to the embodiments illustrated and described herein, but encompasses all the subject matter within the scope of the appended claims and any equivalents thereof. Further, the same reference numbers are used throughout the drawings to refer to the same or like parts.

An event-processing method and system for a network supporting an RUI will be described below. The network includes an RUIS that transmits a notification event with a sequence number or a notification IDentifier (ID) and at least one RUIC that receives and saves the notification event. If the RUIC requests the RUIS to transmit a missed notification event with the sequence number (or notification ID), the RUIS transmits the notification event identified by the sequence number (or notification ID), and then the RUIC receives and saves the notification message. Thereafter, if the RUIC requests the notification page from the RUIS, the RUIS transmits the notification page to the RUIC which in turn receives, saves, and processes the notification page.

In accordance with an embodiment of the present invention, the RUIC performs a device discovery procedure when attempting access to the network and notifies the RUIS of its network entry. If the network entry of the RUIC is detected, the RUIS transmits a notification URL (e.g., savedNotifURL) to the RUIC. After receiving the notification URL, the RUIC can receive the notification events as described above.

Figure 1:
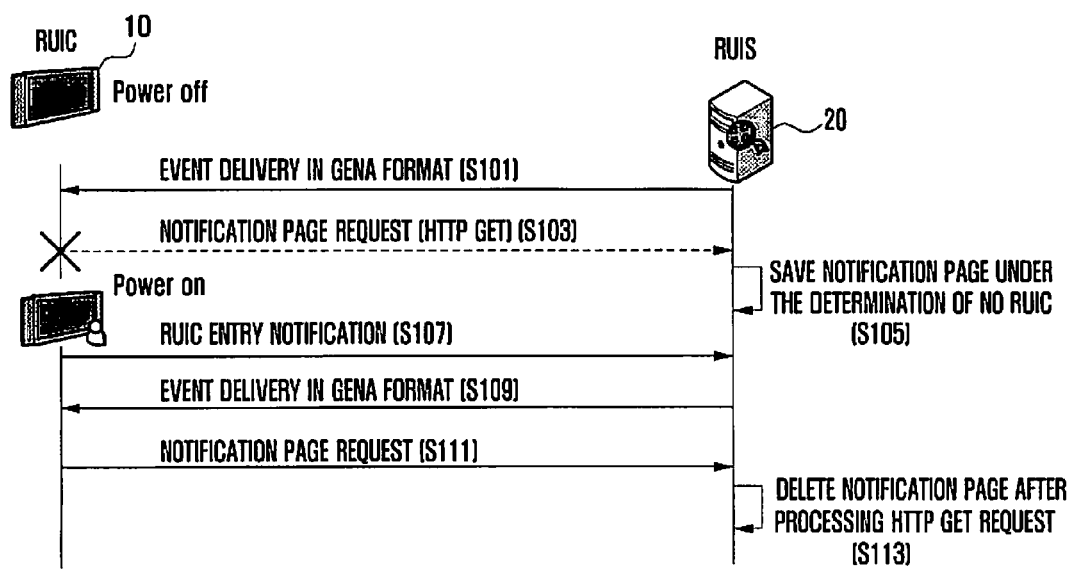
FIG. 1 is a signaling diagram illustrating operations of network entities for delivering $3^{rd}$ party notification event in a conventional home network.
Figure 2:
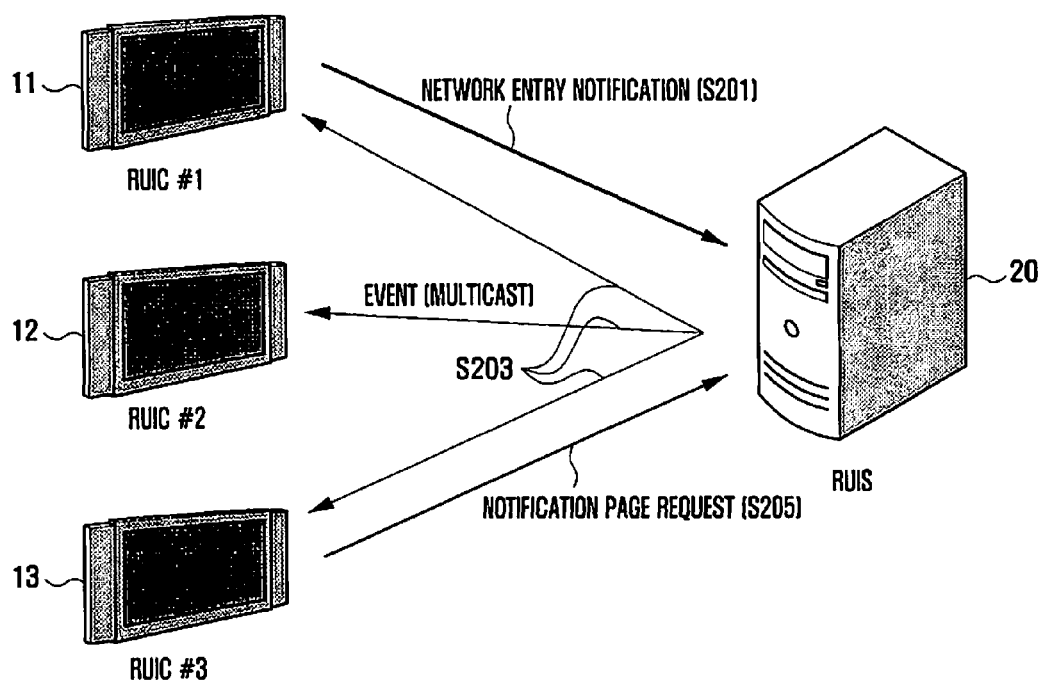
FIG. 2 is a diagram illustrating problematic situations occurring in a conventional event processing method.
Figure 3:
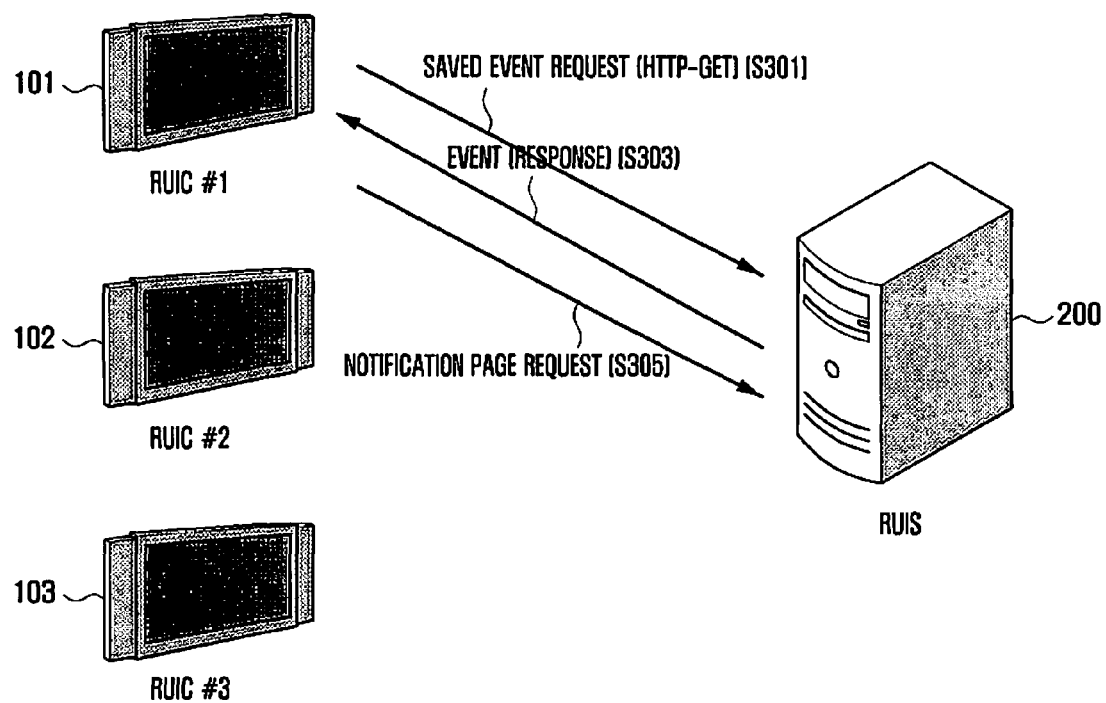
FIG. 3 is a diagram illustrating messages exchanging between an RUIS and an RUIC for processing events in a network according to an embodiment of the present invention.

FIG. 3 is a diagram illustrating messages exchanging between an RUIS and an RUIC for processing events in a network according to an embodiment of the present invention.

Referring to FIG. 3, the network includes a plurality of RUICs 101, 102, and 103, and an RUIS 200. The RUIS 200 transmits notification events to the RUICs 101, 102, and 103 within the network. In accordance with an embodiment of the present invention, the RUIS 200 stores the notification events with individual SEQuence numbers (SEQs). In the following description, the term "notification ID" is used interchangeably with "sequence number".

In FIG. 3, it is assumed that the RUIC#1 101 reconnects to the network after a long absence.

Once the RUIC#1 reconnects to the network, it requests the notification events missed during its absence from the RUIS 200 in step S301. Specifically, the RUIC#1 101 requests, from the RUIS 200, the sequence numbers (or notification IDs) of the notification events that have not been received during its absence. This sequence number request can be transmitted with an absence duration parameter indicating the time interval for which RUIC#1 101 was disconnected from the network or a connection termination parameter indicating the time when RUIC#1 101 disconnected from the network.

Upon receipt of the sequence number request, the RUIS 200 transmits the sequence numbers (or notification IDs) of the notification events received during the absence of the RUIC#1 101, to the RUIC#1 101. The RUIC#1 101 the sequence numbers (or notification IDs) and then requests specific notification events from the RUIS 200 using the received sequence numbers (or notification IDs). That is, the RUIC#1 101 first requests the sequence numbers (or notification IDs) of the saved notification events and then requests the RUIS 200 to transmit at least one of the notification events by transmitting a Saved Event Request message including at least one of the received sequence numbers (or notification IDs).

Upon receipt of the Saved Event Request message, in step S303, the RUIS 200 transmits the notification event identified by the sequence number (or notification ID) included in the Saved Event Request message. After the notification event is received, the RUIC#1 101 requests the RUIS 200 to transmit the notification page, e.g., with reference to a URL of the notification event, in step S305.

As described above, an embodiment of the present invention proposes an improved method for storing and forwarding $3^{rd}$ party notification events. The notification event-processing method can also be implemented with several additional functions.

First, a RUIC is configured to request the RUIS for the notification event. In accordance with an embodiment of the present invention, the RUIC requests the notification event from the RUIS using an http-get method, unlike a conventional method that uses a conventional Universal Plug and Play (UPnP) Discovery mechanism. By using the http-get method, the RUIC can query or request, with a specific parameter, for missed notification events. That is, the RUIC can request all or at least one of the notification events saved in the RUIS by using the http-get method.

Second, the RUIS to stores and forwards stored notification events to the RUIC. Unlike the conventional notification delivery method based on the "push-mode model", however, a notification delivery method according to an embodiment of the present invention is implemented based on a "pull-mode model". In the notification delivery method according to an embodiment of the present invention, the RUIC requests notification events using an http-get message, and the RUIS processes the http-get message and transmits the notification events fulfilling the conditions of the http-get message.

Third, the RUIC locates the RUIS. In order for the RUIC to locate the RUIS, the RUIS provides the RUIC with its location information in a device discovery procedure.

Figure 4:
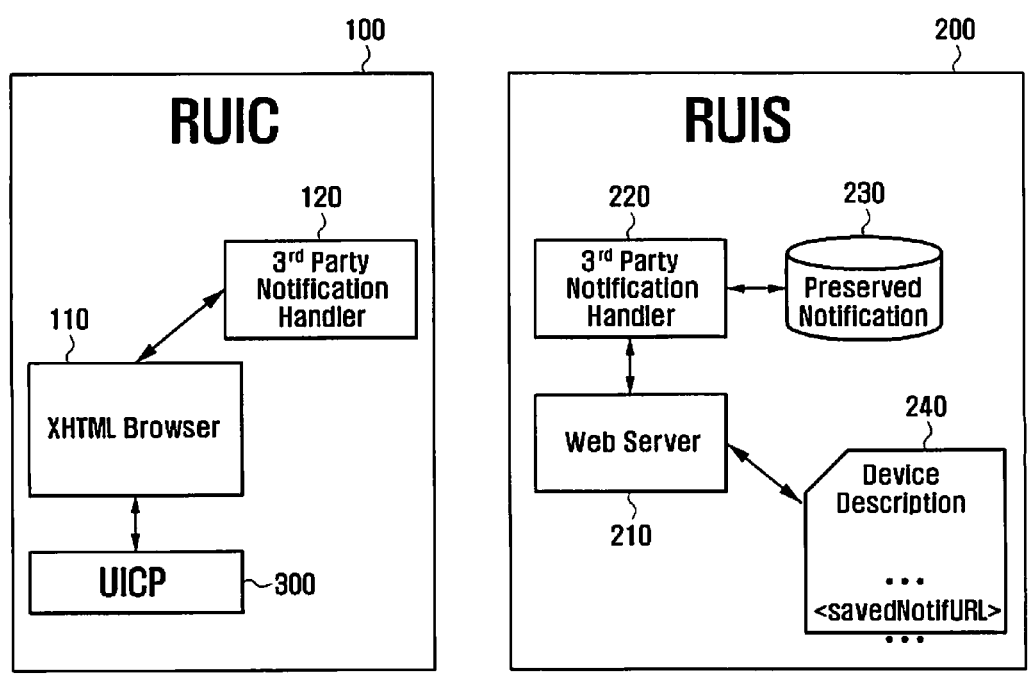
FIG. 4 is a diagram illustrating a home network for implementing an event-processing method according to an embodiment of the present invention.

FIG. 4 is a diagram illustrating a configuration of a home network for implementing an event-processing method according to an embodiment of the present invention.

Referring to FIG. 4, the home network includes an RUIS 200 for forwarding an RUI and third party notification events and an RUIC 100 for processing a notification event received from the RUIS 200 and displaying the RUI to the user. A User Interface Control Point (UICP) 300 discovers devices in the home network and establishes a connection between the RUIC 100 and the RUIS 200. The UCIP 300 can be integrated into the RUIC 100, as illustrated in FIG. 4, or implemented separately outside the RUIC 100.

The RUIS 200 includes a web server 210 that provides the RUIs, a $3^{rd}$ party notification handler 220 for processing $3^{rd}$ party notification events, and a storage 230 for storing the notification events. The $3^{rd}$ party notification handler 220 transmits the saved notification events to the RUIC 100, and the web server 210 processes the notification page request message. The notification page can be stored in a database of the web server 210 or the storage 230. In the embodiment illustrated in FIG. 4, it is assumed that the notification page is stored in a database of the web server 210. The RUIS 200 also stores a device description file 240, which includes the saved notification URLs.

The RUIC 100 or the UICP 300 can request the saved notification events from the RUIS 200, using the saved notification URL (savedNotifURL). The savedNotifURL is the URL from which the RUIC 100 can fetch the $3^{rd}$ party multicast notifications.

The RUIC 100 includes an eXtensible HyperText Markup Language (XHTML) browser 110 for displaying the RUI to the user, and a $3^{rd}$ party notification handler 120 for processing the $3^{rd}$ party notification events. The $3^{rd}$ party notification handler 120 of the RUIC 100 requests the notification using the saved notification request URL of the RUIS 200, which is provided by the UICP 200.

Figure 5:
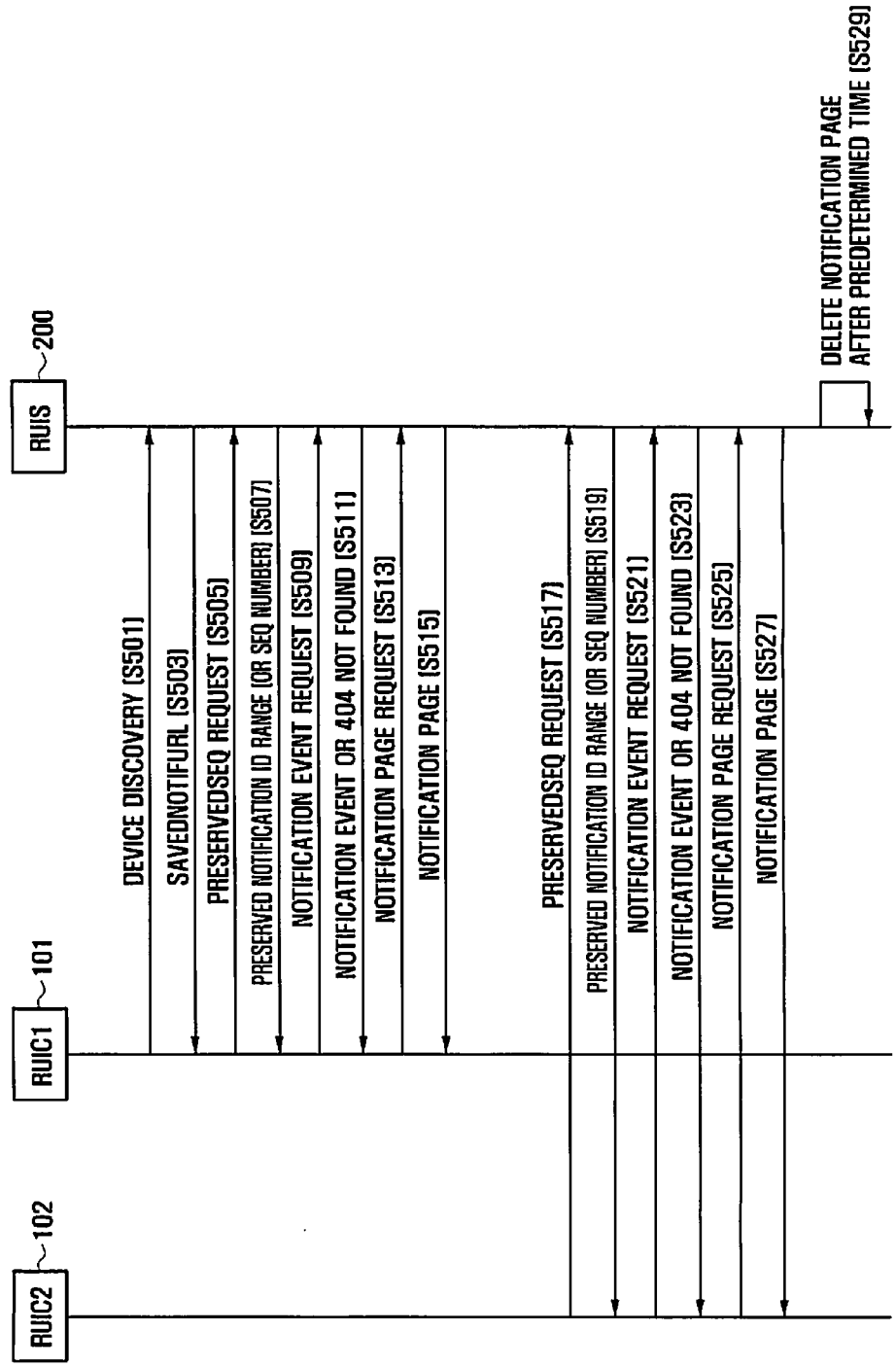
FIG. 5 is a signaling diagram illustrating operations of RUICs and an RUIS for a notification event delivery in an event-processing method according to an embodiment of the present invention.

FIG. 5 is a signaling diagram illustrating operations of RUICs and an RUIS for notification event delivery in an event-processing method according to an embodiment of the present invention.

Referring to FIG. 5, when the RUIC#1 101 re-connects to the network, the RUIC#1 101 discovers the RUIS 200 through device a discovery procedure in step S501. The device discovery may be performed according to the device discovery procedure of the UPnP network by the UCIP 300. When a device discovery request is received, the RUIS 200 transmits the saved notification URL (savedNotifURL) to the RUIC#1 101 in step S503. The RUIC#1 101 stores the savedNotifURL received from the RUIS 200 and requests the RUIS 200 for the saved sequence numbers (or Notification Ids) in step S505. That is, the RUIC#1 101 requests information about the preserved (or saved) sequence (preservedSEQ) or preserved notification ID range (preservedNotificationIDRange) of the notification events generated during its absence. The preserved notification event information may include the time information in addition to the preservedSEQ or preservedNotificationIDRange.

Table 1 below shows an example of an http-get request for use by the RUIC#1 101 in step S505. The RUIC#1 101 may perform an http-get request to savedNotifURL of the RUIS 200 with one of the parameters shown in table 1.

TABLE 1 http://<savedNotifURL>?GetPreservedSEQ&time
or http://<savedNotifURL>?GetPreservedNotificationIDRange&time The http-get request may include the saved notification URL provided by the RUIS 200 and the time information as a parameter, as shown in table 1. In this case, the time information indicates the time to query for the notification events preserved after that time. For example, the time information for the RUIC#1 101 indicates the time at which the RUIC#1 101 disconnected from the network, and the time information for the RUIC#2 102 indicates the time when the previous http-get request for the preservedSEQ (or preservedNotificationIDRange). The time information can be deleted.

When the saved notification event information (PreservedSEQ) request is received in step S505, in step S507, the RUIS 200 sends, to the RUIC#1 101, the sequence numbers or the notification ID range of the preserved notification events corresponding to the time information included in the saved notification event information request. The sequence numbers or the notification ID range can vary depending on a condition (e.g., the time information) included in the saved notification event information request transmitted by the RUIC#1 101.

In some cases, the time information may not be included in the saved notification event information request. In this case, the RUIS 200 transmits the sequence numbers or the notification ID range of all preserved notification events. For example, the RUIS 200 can set a default time and transmit the sequence numbers or the notification ID range of the preserved notification events with reference to the default time.

When the saved notification event information is requested with the notification ID range parameter (e.g., http://<savedNotifURL>?GetPreservedNotificationID-Range&time), the Content Type header for the response can be configured as "text/plain; charset=UTF-8", and the body of the response may include two integer values, [Start-notification-ID] [End-notification-ID] CRLF, where, if the optional "&_time_" parameter is present, then the first integer [Start-notification-ID] is set to the Notification ID of the earliest saved notification message with a timestamp greater than or equal to the indicated timestamp. If the optional "&_time_" parameter is absent, then [Start-notification-ID] is set to the Notification ID of the earliest saved notification message. The second integer [End-notification-ID] corresponds the last notification message sent by the RUIS. CRLF is a line break character as a carriage return.

If the saved notification event information is received from the RUIS 200, the RUIC#1 101 requests the RUIS 200 for the preserved notification events with reference to the sequence numbers or the notification ID range in step 509. When there are multiple preserved notification events, the RUIC#1 101 can repeatedly transmit the request. Table 2 shows an example of an http-get request for use by the RUIC#1 101.

TABLE 2

| http://<savedNotifURL>?GetPreservedNotificaion&SEQ_NO |
| or http://<savedNotifURL>?GetPreservedNotificaion¬ificaion_id |

As shown in table 2, the http-get request transmitted by the RUIC#1 101 can include parameters such as sequence number (SEQ_NO) or notification ID (notification_id) for requesting the notification event.

Upon receipt of the http-get request, the RUIS 200 retrieves the notification event indicated by the sequence number (SEQ_NO) and transmits a HTTP/1.1 200 OK message wherein the body includes the notification event in step S511. However, if there is no preserved notification event matching the sequence number, the RUIS 200 transmits a 404 Not Found message to the RUIC#1 101 in step S511. The notification event includes the URL from which the RUIC#1 101 can receive the notification page.

If the notification message with the indicated Notification ID is available on the RUIS 200, the RUIS 200 can respond as follows:

1. The content-Type header for the response can be "text/plain;charset=UTF-8"; and
2. message body as described in bullet b) of [Req. 5.6.2.c] providing details of the notification.

If the requested notification event is not available on the RUIS 200, the RUIS 200 can respond to the HTTP-GET request with HTTP/1.1. 404 Not Found.

Steps S505 and S509 can be performed by the $3^{rd}$ party notification handler 120 of the RUIC#1 101, and steps S503, S507, and S511 can be performed by the $3^{rd}$ party notification handler 220 of the RUIS 200.

Through the above-described process, the RUIC#1 101 can acquire from the RUIS 200 the sequence numbers or notification ID range of the notification events that are in an unread state and selectively receive the preserved notification events by using the sequence numbers or notification ID range. Consequently, the RUIC#1 101 can fetch the notification page from the URL referenced by the notification event.

After receiving the notification event, the RUIC#1 101 can fetch the notification page from the URL indicated by the notification event. That is, the RUIC#1 101 requests the notification page from the RUIS 200 in step S513, and the RUIS 200 transmits the requested notification page to the RUIC#1 101 in step S515. When the notification page is received, the RUIC#1 101 renders and displays the notification page to the user. The notification page request in step S513 and the notification page rendering can be performed by the XHTML browser 110 of the RUIC#1 101, and the notification page transmission in step S515 can be performed by the web server 210 of the RUIS 200.

Steps S517 to S527 represent the notification event processing procedure for the RUIC#2 102. Further, steps S517 to S527 are almost identical to steps 501 to S515 performed between the RUIC#1 101 and the RUIS 200. Accordingly, when the RUIC#2 102 has maintained its connection to the network, steps corresponding to steps S501 and S503 of FIG. 5 can be skipped for the RUIC#2 102. In this case, the RUIC#2 102 transmits, to the RUIS 200, the preserved sequence numbers or the preserved notification ID range with the time information at a preset time interval or in response to the user's request. Here, the RUIC#1 101 and the RUIC#2 102 can use different time information. That is, the RUIC#2 102 can transmit the time information different from that transmitted by the RUIC#1 101. Accordingly, the sequence numbers or the notification ID ranges returned by the RUIS 200 to the RUIC#1 and RUIC#2 101 and 102 also can differ from each other.

The RUIS 200 can be configured to delete the information on the notification events in step S529, after a predetermined time has elapsed from the transmission of the notification page. The predetermined time can be changed depending on the implementation of the RUIS 200 and set by the user.

Figure 6:
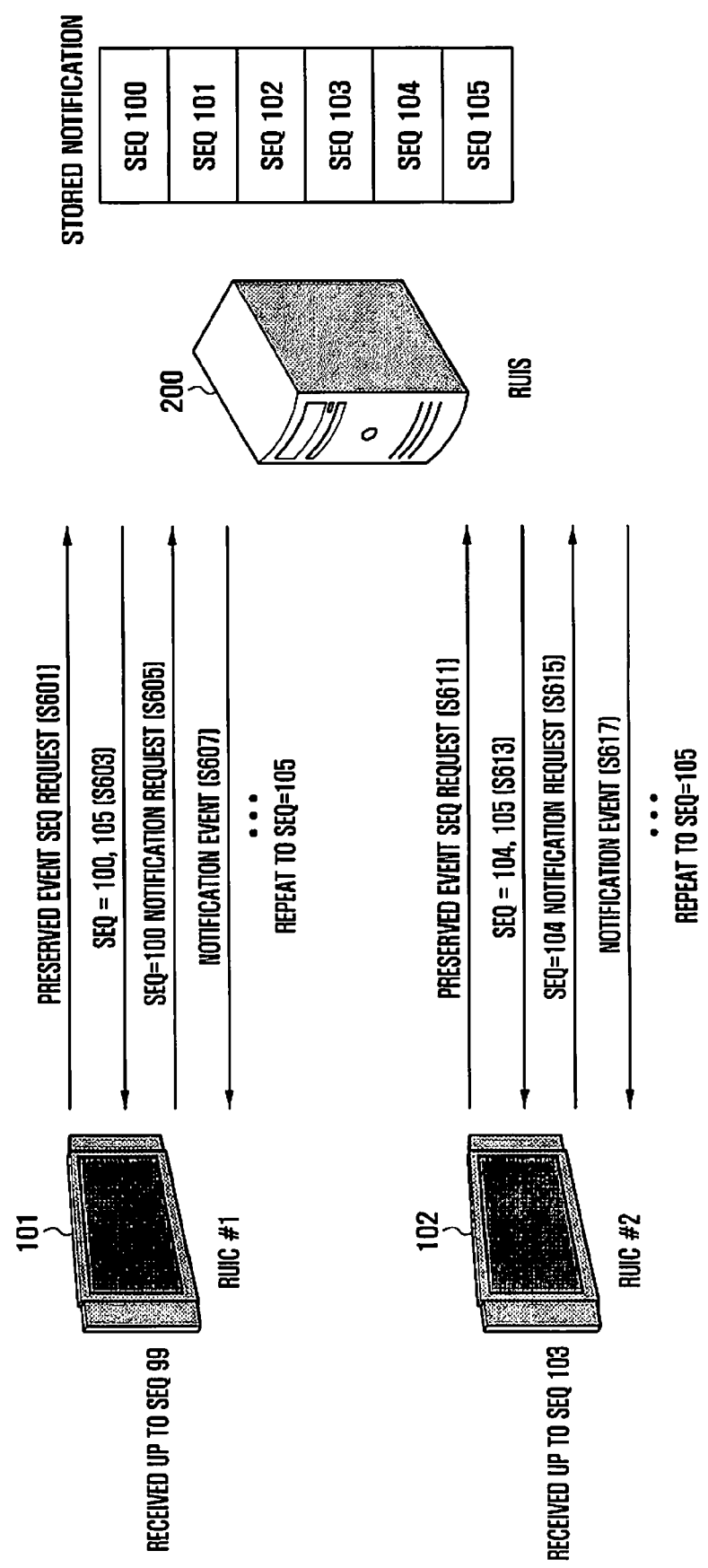
FIG. 6 is a diagram illustrating message flows between RUICs and an RUIS for a preserved notification event delivery in an event-processing method according to an embodiment of the present invention

FIG. 6 is a diagram illustrating message flows between RUICs and an RUIS for preserved notification event delivery in an event-processing method according to an embodiment of the present invention. Although the description is directed to the notification event request with the sequence number, the notification ID range may be used instead.

In FIG. 6, it is assumed that the RUIS 200 has preserved notification events with sequence numbers from SEQ 100 to SEQ 105, and that the RUIC#1 101 and the RUIC#2 102 have been disconnected from the network, after receiving notification events with sequence numbers SEQ 99 and SEQ 103, respectively.

When the RUIC#1 101 re-enters the network, it queries the RUIS 100 as to whether there are any notification events preserved after a time indicated by a time information parameter in step S601. That is, the RUIC#1 101 transmits a Preserved event SEQ request (http-get request), as shown in table 1, to the RUIS 200, for the preserved SEQs.

Upon receipt of the Preserved event SEQ request transmitted by the RUIC#1 101, the RUIS 200 determines the sequence numbers to be returned to the RUIC#1 101 based on the time information of the Preserved event SEQ request and returns the sequence numbers from SEQ 100 to SEQ 105 in step S603. After receiving the sequence numbers, the RUIC#1 101 requests the RUIS 200 to transmit the notification events starting from SEQ 100 in step S605. That is, the RUIC#1 101 transmits a notification event request (http-get request), as shown in table 2, to the RUIS 200, for the preserved notification events.

Upon receipt of the notification event request, the RUIS 200 transmits the preserved notification events identified by sequence numbers from SEQ 100 to SEQ 105, to the RUIC#1 101, one by one, in step S607.

When the RUIC#1 101 is reconnected to the network, it performs the device discovery procedure and savedNotifURL reception procedure and then fetches, from the RUIS, the preservedSEQ information of the notification events generated after a specific time (here, the time when the RUIC#1 has been disconnected from the network). The RUIS 200 may transmit to the RUIC#1 101 the preservedSEQ indicating SEQ 100 to SEQ 105.

Once the preservedSEQ is received, the RUIC#1 101 can request the RUIS 200 for at least one of the preserved notification events identified by the received sequence numbers, i.e., SEQ 100 to SEQ 105, using the notification event request (http-get request), as shown in table 2.

In order to receive all of the preserved notification events, the RUIC#1 101 can repeatedly transmit the notification event request (http-get request), as shown in table 2, by incrementing the sequence number (from SEQ 100 to SEQ 105). Here, the notification events can be formed in the XML file format and include a URL string for requesting the notification page. The RUIC#1 101 fetches the notification events and notification page preserved in the RUIS 200 through the procedures illustrated in steps S501 to S515 of FIG. 5.

The RUIC#2 102 requests the RUIS 200 for the sequence numbers of the preserved notification events using the time parameter in step S611. Because the RUIC#2 102 lastly received the notification event SEQ 103, the RUIS 200 returns the sequence numbers SEQ 104 and SEQ 105 to the RUIC#2 102 in response to the request in step S613. In response, the RUIC#2 102 requests the RUIS 200 to transmit the notification events from SEQ 104 in step S615. In response to the notification event request, the RUIS 200 transmits to the RUIC#102 the notification events of SEQ 104 and SEQ 105 in step S617.

Because the RUIC#2 102 has maintained its connection to the network, the device discovery and savedNotifURL reception processes can be omitted. The RUIC#2 102 requests the RUIS 200 for the sequence numbers of the notification events preserved after a specific time (here, the time set in the RUIC#2 102 or input by the user), and the RUIS 200 returns the preservedSEQ (i.e. SEQ 104 and SEQ 150) to the RUIC#2 102.

Once the preservedSEQ is received, the RUIC#2 102 can request the RUIS 200 for at least one notification event identified by the sequence numbers SEQ 104 and SEQ 105, using the http-get request, as shown in table 2. In order to requests all of the preserved notification events, the RUIC#2 102 can repeatedly transmit the http-get request (see table 2) by incrementing the sequence number. Here, the notification events can be formed in XML file format including a URL string to fetch the notification page. The RUIC#2 102 fetches the notification events and notification page preserved in the RUIS 200 using the procedures illustrated in steps S517 to S527 of FIG. 5.

As described above, a method for processing $3^{rd}$ party notification events preserved in a home network according to the present invention is advantageous to process the notification events efficiently with a pull mode method as compared to a conventional method.

Because the event-processing method of the present invention is capable of using an RUIC-specific condition for requesting notification events, multiple RUICs can fetch different notification events. Also, an RUIC can selectively fetch all or at least one of the preserved notification events by changing a condition in the request.

Unlike conventional methods based on a multicast transmission method in which the notification page is deleted when an RUIC processes the corresponding notification event, such that another RUIC cannot process the notification event, an event-processing method in accordance with an embodiment of the present invention uses an http-get method for notification event delivery, such that the RUIS can preserve the notification events and retransmit the preserved notification events whenever the notification events are requested by the RUICs.

Additionally, an event-processing method in accordance with an embodiment of the present invention uses sequence numbers (SEQs) for processing notification events, such that an RUIC can fetch multiple preserved notification events identified by the sequence numbers from an RUIS in a sequential order.

Although certain embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims.

What is claimed is:

1. A notification event-processing method for a remote user interface client in a network including a remote user interface server, the method comprising:
   transmitting, by the remote user interface client, a notification event information request to the remote user interface server;
   receiving, from the remote user interface server, notification event information corresponding to the notification event information request;
   transmitting a notification message request based on the received notification event information to the remote user interface server; and
   receiving, from the remote user interface server, at least one notification message corresponding to the notification message request,
   wherein the notification event information request includes a notification identifier range and time information.

2. The method of claim 1, further comprising:
   fetching a notification page using a Uniform Resource Locator (URL) included in the at least one notification message; and
   rendering and displaying the notification page,
   wherein the at least one notification message is formed in eXtensible Markup Language (XML).

3. The method of claim 1, further comprising:
   performing a device discovery operation, when the remote user interface client connects to the remote user interface server; and
   receiving a Saved Notification URL (savedNotifURL) for stored notification messages from the discovered remote user interface server.

4. The method of claim 1, wherein the notification event information includes a notification identifier range and time information,
   wherein the time information indicates a time when notification messages for the remote user interface client start being saved, and
   wherein the notification event information request includes an http-get request in a format of "http://<savedNotifURL>?GetPreservedNotificationIDRange&time".

5. The method of claim 4, wherein the notification message includes a notification ID, and
   wherein the notification event information request includes an http-get request in a format of "http://<savedNotifURL>?GetPreservedNotification¬ification_id".

6. A notification event-processing method for a remote user interface server in a network including the remote user interface server and at least one remote user interface client, the method comprising:
   receiving, by the remote user interface server, a request for notification event information from a remote user interface client among the at least one remote user interface client;
   transmitting the notification event information of preserved notification messages indicated by the request, to the remote user interface client;
   receiving, from the remote user interface client, a request for at least one notification message among the preserved notification messages; and
   transmitting at least one of the preserved notification messages corresponding to the at least one notification message requested by the remote user interface client, wherein the notification event information request includes a notification identifier range and time information.

7. The method of claim 6, further comprising:
receiving, from the remote user interface client, a request for a notification page using a Uniform Resource Locator (URL);
transmitting the notification page to the remote user interface client.

8. The method of claim 6, further comprising:
performing a device discovery operation, when the remote user interface client connects to the remote user interface server; and
transmitting a saved notification URL (savedNotifURL) that stores notification messages, to the client.

9. The method of claim 6, wherein the request for notification event information includes an http-get request including a notification Identifier (ID) range and time information,
wherein the time information indicates a time when notification messages for the remote user interface client start being saved, and
wherein the http-get request is in the format of "http://<savedNotifURL>?GetPreservedNotificationID-Range&time".

10. The method of claim 9, wherein the notification event information includes the notification ID range defined with a start notification ID and an end notification ID for the notification messages preserved from a time indicated by the time information to a current time.

11. The method of claim 10, wherein the notification event information includes the start notification ID and the end notification ID.

12. The method of claim 6, wherein the remote user interface server receives individual multiple requests for each of the at least one notification messages, and
wherein each of the multiple requests includes an http-get request in a format of "http://<savedNotifURL>?GetPreservedNotification¬ification_id".

13. The method of claim 6, further comprising deleting a preserved notification message for which a predetermined preservation time has expired.

14. A system for processing notification messages, comprising:
a remote user interface client for requesting notification event information and requesting at least one stored notification message by referencing acquired notification event information; and
a remote user interface server for storing notification messages, transmitting, to the remote user interface client, the notification event information requested by the client, retrieving the requested at least one stored notification message, and transmitting the retrieved at least one stored notification message to the remote user interface client,
wherein the notification event information request includes a notification identifier range and time information.

15. The system of claim 14, wherein the remote user interface client comprises a eXtensible Hypertext Markup Language (XHTML) browser that requests a notification page using a Uniform Resource Locator (URL) included in a received notification message, and renders and displays the notification page, and
wherein the remote user interface server comprises a web server that accesses the notification page and transmits the notification page to the remote user interface client.

16. The system of claim 15, further comprising a User Interface Control Point (UICP) that controls a device discovery process between the remote user interface client and the remote user interface server, when the remote user interface client connects to the server,
wherein the remote user interface client receives a Saved Notification URL (savedNotifURL) included in notification messages transmitted by the remote user interface server, after completion of the device discovery process.

17. The system of claim 14, wherein a request for the at least one stored event comprises:
a notification Identifier (ID) range;
time information using; and
an http-get request, the time information indicating a time when the notification event for the remote user interface client starts being saved, and the http-get request being in a format of "http://<savedNotifURL>?GetPreservedNotificationIDRange&time".

18. The system of claim 17, wherein the remote user interface server transmits, when receiving a notification event information request from the remote user interface client, the notification ID range defined with a start notification ID and an end notification ID for notification messages stored from the time indicated by the time information to a current information.

19. The system of claim 18, wherein the remote user interface client repeatedly requests the remote user interface server for multiple notification messages, one by one, by transmitting an http-get request in a format of "http://<savedNotifURL>?GetPreservedNotification¬ification_id".

20. The system of claim 19, wherein the remote user interface server deletes a stored notification message for which a predetermined storage time has expired.

* * * * *